United States Patent
Scarborough, III

(10) Patent No.: US 8,381,586 B2
(45) Date of Patent: Feb. 26, 2013

(54) UNITARY DRIVE SYSTEM FOR WATER METER

(75) Inventor: John Raymond Scarborough, III, Auburn, AL (US)

(73) Assignee: Neptune Technology Group, Inc., Tallassee, AL (US)

( * ) Notice: Subject to any disclaimer, the term of this patent is extended or adjusted under 35 U.S.C. 154(b) by 498 days.

(21) Appl. No.: 12/723,408

(22) Filed: Mar. 12, 2010

(65) Prior Publication Data

US 2011/0219870 A1 Sep. 15, 2011

(51) Int. Cl.
*G01F 3/32* (2006.01)

(52) U.S. Cl. ........... 73/238; 73/236; 73/239; 73/241; 73/244

(58) Field of Classification Search .......... 73/236, 73/237, 238, 239, 258
See application file for complete search history.

(56) References Cited

U.S. PATENT DOCUMENTS

| | | | |
|---|---|---|---|
| 410,308 A | 9/1889 | Brown | |
| 452,489 A | 5/1891 | Thomson | |
| 486,992 A * | 11/1892 | Tilden | 73/258 |
| 1,552,655 A | 9/1925 | Thomson | |
| 2,766,733 A | 10/1956 | Jacobson | |
| 2,921,468 A | 1/1960 | Treff | |
| 2,984,088 A | 5/1961 | Cooper | |
| 2,992,635 A | 7/1961 | Nasvytis | |
| 3,019,964 A | 2/1962 | Griswold | |
| 3,094,040 A | 6/1963 | Judge | |
| 3,102,517 A | 9/1963 | Day | |
| 3,323,466 A | 6/1967 | Ford | |
| 3,492,974 A | 2/1970 | Kreimeyer | |
| 3,514,233 A | 5/1970 | Braun | |
| 3,765,687 A * | 10/1973 | Weiss | 277/503 |
| RE28,000 E * | 4/1974 | Branitzky | 73/258 |
| 3,981,639 A | 9/1976 | Wahl | |
| 3,989,421 A | 11/1976 | Ritchie | |
| 3,999,900 A | 12/1976 | Reis | |
| 4,028,020 A | 6/1977 | Ritchie | |
| 4,181,478 A | 1/1980 | Weber | |
| 4,441,869 A | 4/1984 | Larsen | |
| 4,919,601 A | 4/1990 | Kim | |
| 5,242,281 A | 9/1993 | Hartley | |
| 5,251,480 A | 10/1993 | Brunson | |
| 5,251,594 A | 10/1993 | Meyer | |
| 5,261,275 A | 11/1993 | Davis | |
| 5,482,449 A | 1/1996 | Meyer | |
| 6,948,363 B1 | 9/2005 | Karsten | |
| 7,143,645 B2 | 12/2006 | Benson | |

FOREIGN PATENT DOCUMENTS

DE 10209250 9/2003

* cited by examiner

*Primary Examiner* — Lisa Caputo
*Assistant Examiner* — Roger Hernandez-Prewitt
(74) *Attorney, Agent, or Firm* — Paul M. Sykes; Bradley Arant Boult Cummings LLP

(57) ABSTRACT

A metering apparatus for measuring the flow of water or other fluid through a conduit. The meter comprises a measuring chamber, in which is disposed a nutating ball and disc. A unitary biaxial member, comprising a drive shaft and a spindle having a longitudinal axis offset from that of the drive shaft, couples the ball and disc to a rotating magnet. The unitary biaxial member both controls the offset of the ball and disc from horizontal, such that it nutates in response to water flow through the meter, and translates this nutation to rotation of the magnet, allowing for measurement of water volume flowing through the measuring chamber.

24 Claims, 6 Drawing Sheets

UNITARY DRIVE SYSTEM FOR WATER METER

TECHNICAL FIELD

The invention relates generally to the field of metering devices to measure fluid flow, and in particular to water meters.

BACKGROUND

Various mechanisms have been developed for use in meters to translate flow of a liquid, such as water, to a measurable quantity. One such mechanism known in the art is the use of a nutating ball and disc in a measurement chamber through which water flows under pressure. The measurement chamber is of known volume. As water passes through it, the ball and disc nutate. This nutation is then translated to rotation of a magnet, such that each rotation of the magnet represents a known quantity of water passing through the meter.

In a traditional nutating disc meter, such as that shown in FIG. 10, a measuring chamber is enclosed within a brass housing. The measuring chamber includes a ball socket that contains the ball of the ball and disc. A spindle extends radially from the top of the ball through an enlarged opening in the top of the ball socket. Above the ball is an inverted frustum, often called a control block. The spindle bears against the control block, which keeps the spindle offset from vertical, and thereby the ball and disc offset from horizontal. The angle of offset caused by the control block corresponds to the angle of the slope of the top and bottom walls of the measuring chamber. The ball and disc nutate in response to the flow of a pressurized liquid, such as water, through the measuring chamber. As the ball and disc nutate, the spindle precesses about the control block. The spindle contacts a tab on the end of a drive shaft, causing it to rotate. The drive shaft is coupled to a magnet and therefore each nutation of the ball and disc is translated to a rotation of the magnet. The magnet couples to a register on the outside of the meter housing, which contains mechanical, electrical, or electromechanical means of recording the number of rotations of the magnet and thereby measuring water flow through the meter.

The foregoing design suffers from several problems. First, the control block increases the height of the assembly, which necessitates a larger housing and thus more material to make the housing. This increases the cost of meter, because the housing is usually made of brass or other durable, weather-resistant material. Also, the spindle is usually made of stainless steel for its strength and anti-corrosive properties. The ball and disc, however, is made of plastic, and the spindle must be inserted precisely into the ball during manufacture. Thus, the prior art's use of a separate stainless steel spindle increases both the materials cost and the assembly cost of the meter. In addition, the ball socket must have a large opening in order for the spindle to precess about the control block. This in turn reduces the surface area of the ball socket available to distribute the load of the ball as it rotates, which results in increased wear of the ball socket over time.

The prior art design also requires multiple components for translation of motion and control. The offset angle of the ball and disc is controlled by the control block. Translation of nutation to rotation is accomplished with the spindle and drive shaft. Thus, three separate parts are necessary to perform these functions.

Thus, there exists a need for a meter in which a single element controls the angular offset of the ball and disc and translates nutation to rotation, and in which the requirement of a control block is eliminated to reduce the height of the meter and therefore the size of the meter housing, saving cost. Further, there exists a need for a nutating-disc meter in which the surface area of the ball socket is not compromised to accommodate a control block and a precessing spindle.

SUMMARY

Embodiments of the present invention satisfy these needs. One embodiment of the present invention comprises a measuring chamber, a rotating magnet, a ball and disc within the measuring chamber, and a unitary biaxial member coupling the ball and disc to the rotating magnet. The ball is situated in a ball socket within the measuring chamber. The measuring chamber has a hole that is coaxial with the axis of rotation of the magnet. The ball has a diametric bore, open at its upper end. The unitary biaxial member comprises a drive shaft joined to a spindle, wherein the spindle's longitudinal axis is offset from that of the drive shaft. The spindle is disposed within the bore in the ball and rotates freely therein. The drive shaft extends from the ball through the opening in the ball socket to couple with the magnet. The opening in the ball socket constrains the drive shaft into coaxial alignment with the rotating magnet, such that the offset between the axis of the drive shaft and the axis of the spindle causes the ball and disc to be offset from horizontal. In response to water flowing through the chamber, the ball and disc nutate and the spindle traces a cone, or precesses, about the longitudinal axis of the drive shaft. As the spindle precesses, the drive shaft rotates and turns the magnet, which allows for measuring of water flow through the measuring chamber. In one embodiment, the spindle is joined to the drive shaft by a cap. The cap is disposed within a cavity defined substantially by a small circle of the ball that is of sufficient size to allow the cap to rotate freely therein. The outer side of the cap may be in the shape of a portion of a sphere having the same diameter as the ball, such that the cap sits in the cavity flush with the surface of the ball. In another embodiment, the ball socket comprises a substantially cylindrical extension concentric with the opening in the ball socket. In this embodiment, the spindle is joined to the drive shaft by a round shoulder, concentric with the drive shaft, that is adapted to fit within the cylindrical extension. The extension is configured to permit rotation of the shoulder as the ball and disc nutate in response to water flow through the meter.

BRIEF DESCRIPTION OF THE DRAWINGS

The present invention will be explained, by way of example only, with reference to certain embodiments and the attached Figures, in which.

DETAILED DESCRIPTION

Figure 1:
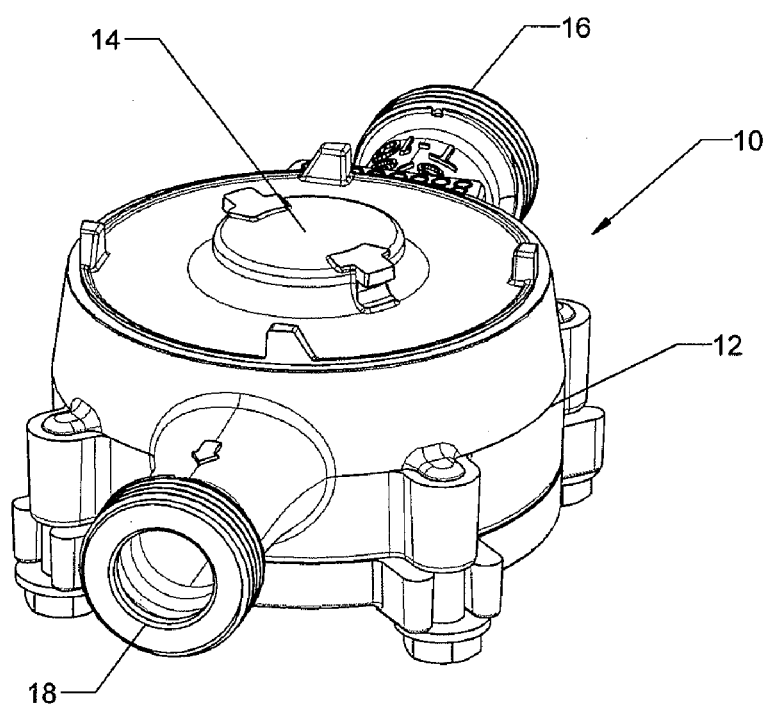
FIG. 1 is a perspective view of a water meter comprising an embodiment of the present invention.
Figure 5:
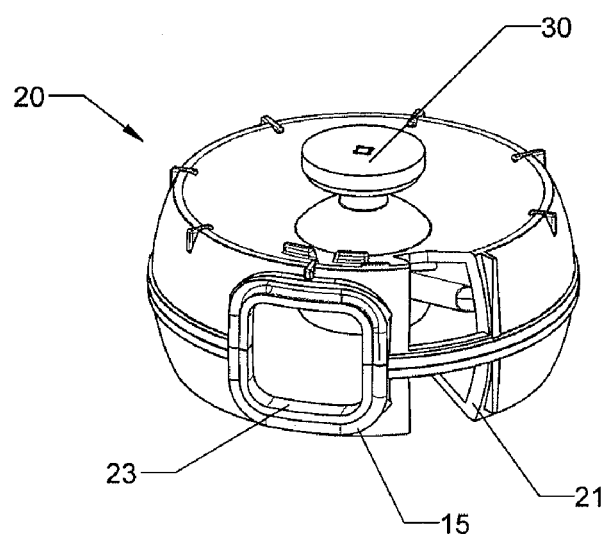
FIG. 5 is a perspective view of the embodiment of FIG. 1, with the external case removed.
Figure 6:
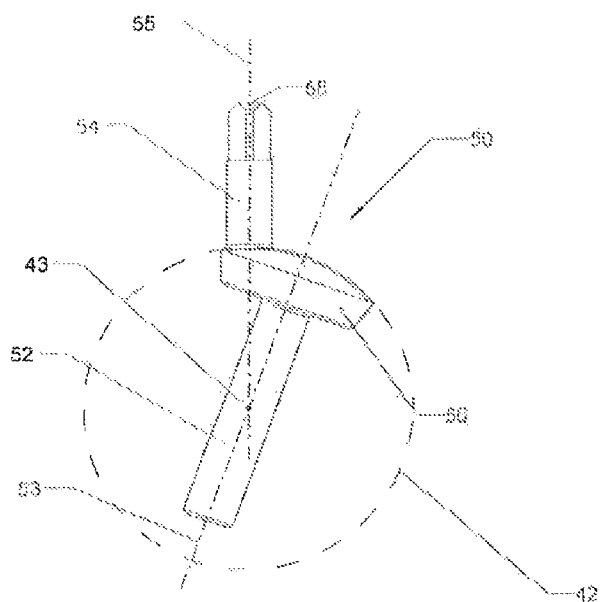
FIG. 6 is a side view of one embodiment of the unitary biaxial member of the present invention, with the axes of the drive shaft and spindle, and the ball of the ball and disc, shown in dashed lines.

Referring to FIGS. 1-5, a meter 10 comprising an embodiment of the present invention is shown. The meter 10 comprises a housing 12, a measuring chamber 20, a magnet 30, a ball and disc 40, and a unitary biaxial member 50 coupling the ball and disc 40 to the magnet 30. A separate register (not shown), to record measurement data as is known in the art, attaches to the meter at location 14. As best shown in FIG. 6, the unitary biaxial member 50 comprises a spindle 52, a drive shaft 54, and a connector 56 joining the spindle 52 to the drive shaft 54. It should be noted that the meter 10 is described herein with respect to measuring water flow, but the meter 10 also can be used for measuring any liquid or fluid.

Figure 2:
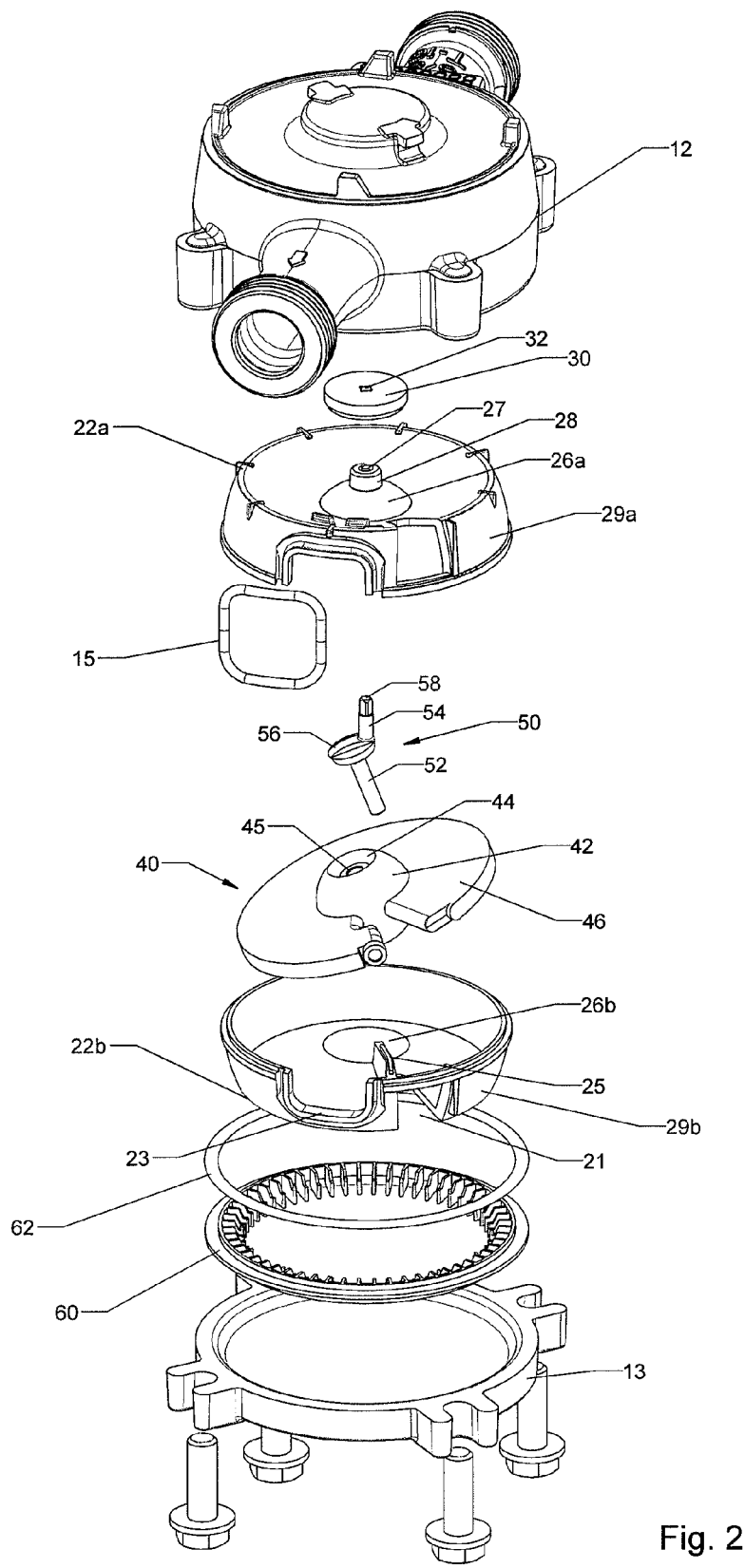
FIG. 2 is a perspective exploded view of the embodiment of FIG. 1.
Figure 3:
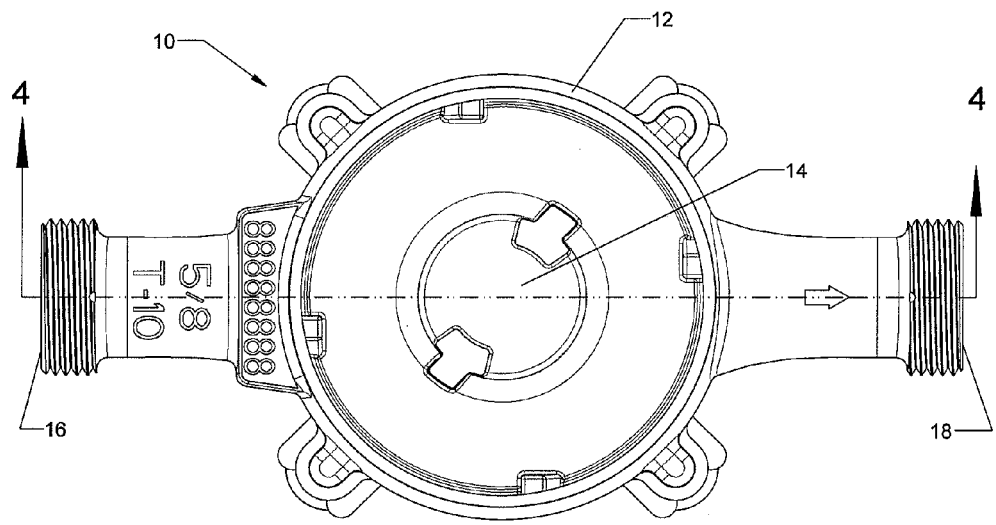
FIG. 3 is a plan view of the water meter of FIG. 1.

The meter housing 12 includes a water entry 16 and exit 18. Likewise, as shown in FIGS. 2 and 5, the measuring chamber 20 includes a port for water ingress 21 and for egress 23, and a diaphragm 25 that separates the ingress 21 from the egress 23. The egress port 23 on the measuring chamber is aligned with and sealed to the exit 18 of the meter housing 12 with gasket 15. The meter housing 12, in conjunction with a bottom cap 13 and a gasket 62, form a watertight enclosure around measuring chamber 20. In a preferred embodiment, a strainer 60 is disposed between the lower portion of the measuring chamber 20 and the bottom cap 13 of the meter housing 12. The strainer 60 includes fins that may capture debris in the water flow. Pressurized water from a supply line thus flows into the entry 16 in the meter housing, filling the space between the measuring chamber 20 and the interior of the housing 12. The water is forced to flow into the ingress 21 of the measuring chamber, into contact with the ball and disc 40, causing it to nutate as described below. The water then flows through the measuring chamber 20 and out the egress 23.

Figure 4:
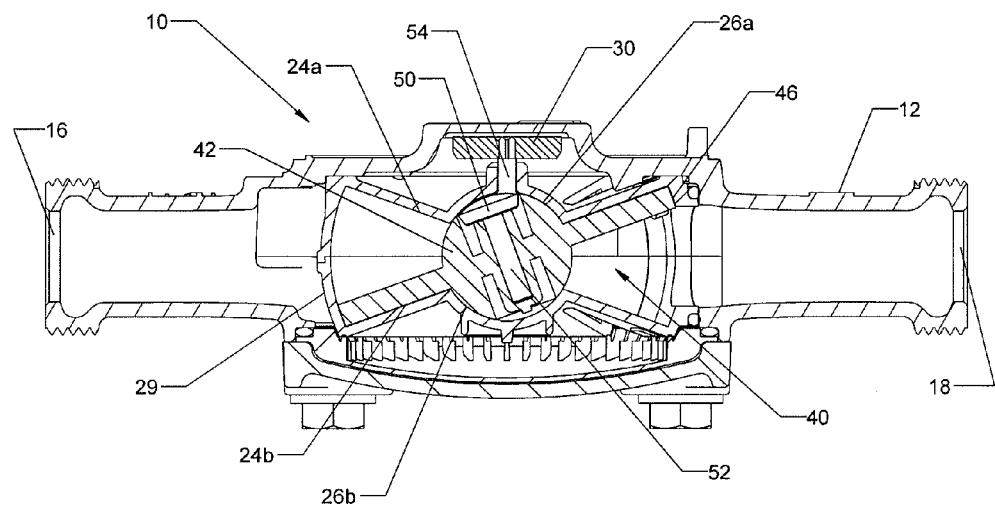
FIG. 4 is a sectional view of the water meter of FIG. 1, taken along the line indicated in FIG. 3.

To facilitate manufacture and assembly, the chamber 20 is divided into an upper portion 22a and a lower portion 22b. The chamber 20 comprises a ball socket 26, comprising an upper portion 26a and a lower portion 26b on the upper and lower portions 22a and 22b of the chamber 20, respectively. A ball and disc 40 is disposed within the measuring chamber 20, with the ball disposed within the ball socket 26. The ball and disc 40 is preferably a single integral unit, comprising a ball 42 and a disc 46. As shown in FIG. 4, the profile of the measuring chamber extends from the ball socket in the shape of a truncated cone with sloping upper and lower walls 24a and 24b terminating at a sweep wall 29 (comprising upper and lower sweep walls 29a and 29b) having a radius of curvature equivalent to the radius of the disc 46. Thus, the radius of the sweep wall 29 of the measuring chamber is very slightly larger than the radius of the disc 46, with clearance sufficient only to allow for movement of the disc 46 relative to the sweep wall 29 in the presence of water flow, but without letting any significant volume of water flow between the edge of the disc 46 and sweep wall 29.

The ball 42 has a diametric bore 45. In one embodiment, the bore 45 extends all the way through the ball 42 such that the bore 45 is open on both the top and bottom. In another embodiment (shown), the bore 45 terminates short of the bottom the ball 42, such that the bottom of the bore 45 is closed. The bore is sized to receive the spindle 52 of the unitary biaxial member 50. The spindle 52 fits closely within the bore 45 but is free to rotate therein. In one embodiment, the spindle is fluted to receive and flush small particles and debris that may be present in water flowing through the meter.

The bore 45 may terminate at its upper end into a cavity 44 on the periphery of the ball 42. The cavity 44 is defined substantially by the intersection of a plane with the ball 42, that is, by a small circle of the spherical ball 42. The cavity extends inwardly to the terminus of bore 45. In this embodiment, the connector 56 of the unitary biaxial member 50 is a cap adapted to fit flush within the cavity 44. The outer surface of the cap 56 can be curved at the same radius as ball 42, such that with the cap 56 seated in cavity 44, the outer surface of cap 56 completes the sphere of ball 42.

The drive shaft 54 of the unitary biaxial member 50 extends upwards from the connector 56 through a hole 27 in the center of the ball socket 26. The distal end 58 of the drive shaft, that is, the end away from the connector 56, couples to the magnet 30. In a preferred embodiment, the magnet 30 includes a socket 32 and the distal end 58 of the drive shaft 54 is configured to mate with the socket 32 so that it fits securely therein. The hole 27 in the center of the ball socket thus constrains the movement of the drive shaft such that it rotates rather than traces a cone, or precesses, and fixes the axial orientation of the drive shaft 54 into a vertical (as shown) orientation. In a preferred embodiment, an annular member 28 coaxial with the hole 27 protrudes from the top of the ball socket 26. This effectively lengthens hole 27 into a bore and more precisely constrains the axial orientation of the drive shaft 54.

As shown in FIG. 6, the longitudinal axis 53 of the spindle 52 is offset angularly from the longitudinal axis 55 of the drive shaft 54. In a preferred embodiment and for optimal results, the intersection of the axes 53 and 55 for the spindle 52 and the drive shaft 54, respectively, should be coincident with the center 43 of the ball 42 as closely as possible. The connector 56 is sized to locate this intersection properly with respect to the center 43 of the ball 42.

With the axial orientation of the drive shaft fixed by the hole 27, the spindle 52 causes the disc 46 to be offset from horizontal when inserted therein. Thus, the unitary biaxial member sets the ball and disc 40 at a desired angle within the measuring chamber 20, which angle is the same as the slope of the upper and lower walls 24a and 24b of the measuring chamber 20 extending from the ball socket 26a and 26b to the sweep wall 29. As pressurized water flows into the ingress 21 of the measuring chamber 20 and into contact with the disc 46, the ball and disc 40 nutate to permit passage of the water through the measuring chamber 20. As the ball and disc 40 nutate, the spindle 52 rotates within the bore 45 in the ball 42, and also precesses, or traces a cone, about the longitudinal axis of the drive shaft 54. With the drive shaft 54 joined to the spindle 52 by the connector 56, the unitary biaxial member 50 translates the nutation of the ball and disc 40 into rotation of the drive shaft 54, which in turn rotates the magnet 30. The magnet 30 rotates one time for each complete nutating cycle of the ball and disc 40.

The unitary biaxial member 50 is a driven element; that is, it moves as a result of the water flow. It translates that flow to rotary motion, as described above. It is desirable for this translation to occur as efficiently as possible. There is inevitably friction between the drive shaft 54 and the hole 27, and between the spindle 52 and the bore 45. These frictional forces create torques that retard the motion of these components. The magnitude of the retarding torques is directly proportional to distance from the point of contact to the center of rotation, that is, the diameters of the drive shaft 54 and of the spindle 52. A relatively slender drive shaft 54 and spindle 52 is used to reduce these retarding torques. In a preferred embodiment, the diameter of the drive shaft 54 is between one-fourth and one-eighth the diameter of the ball 42.

The interior of measuring chamber 20 is of a known and predetermined volume, as is the displacement of the ball and disc 40. Thus, each rotation of the magnet 30 represents a known volume of water passing through the measuring chamber 20 of the water meter 10. As noted above, a separate register (not shown) attaches to the meter housing at location 14. When the magnet 30 rotates, it couples with the register, as is known in the art. The register records the number of rotations of the magnet over time, using electrical, mechanical, or electromechanical means, and thereby measures water flow.

Figure 9:
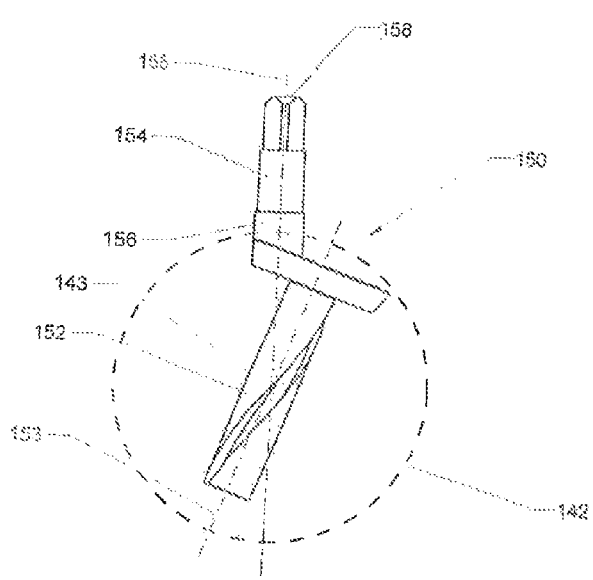
FIG. 9 is a side view of the unitary biaxial member used in the embodiment shown in FIG. 7, with the axes of the drive shaft and spindle, and the ball of the ball and disc, shown in dashed lines.
Figure 7:
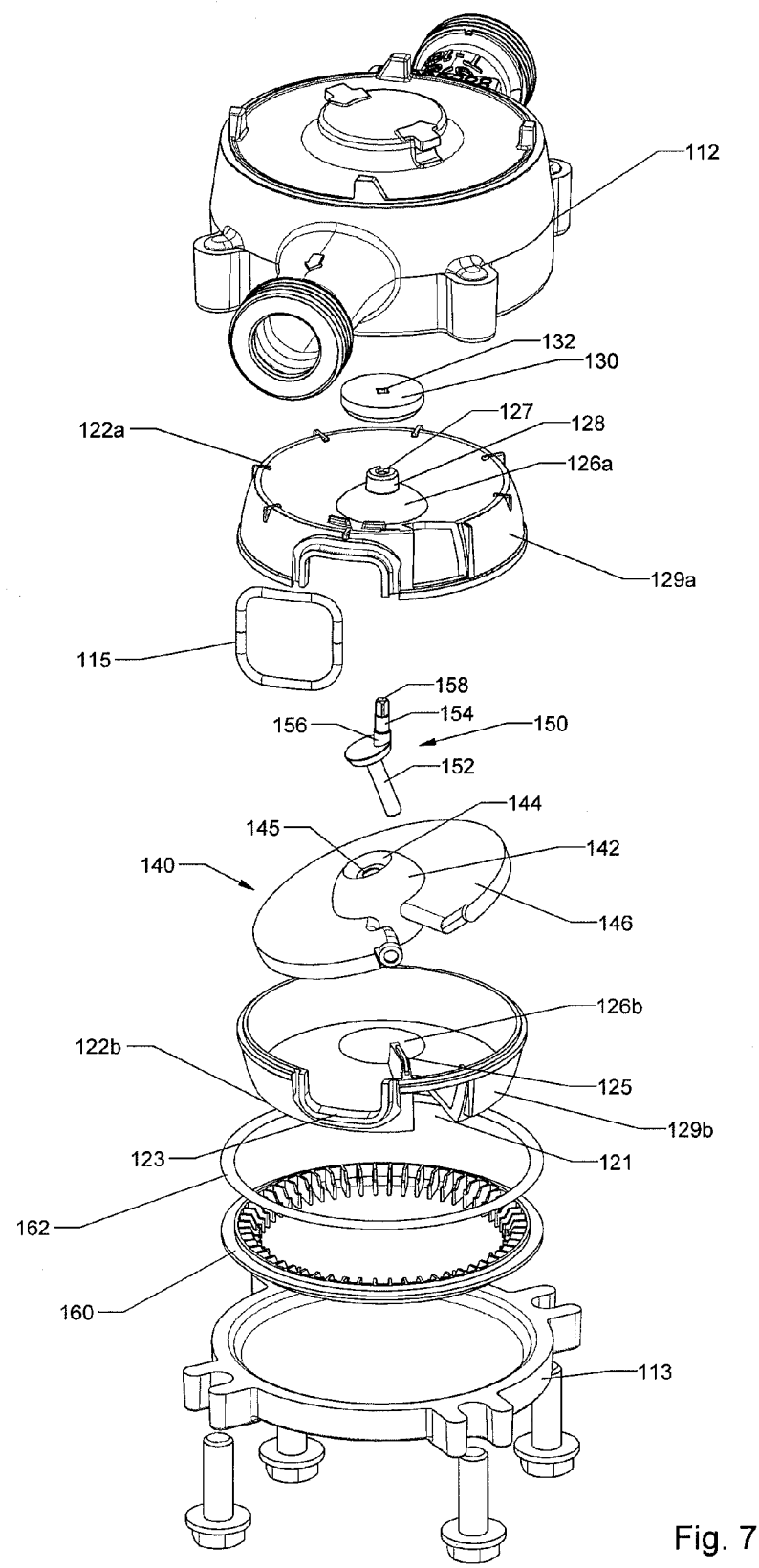
FIG. 7 is a perspective exploded view of a water meter comprising an alternative embodiment of the present invention.
Figure 8:
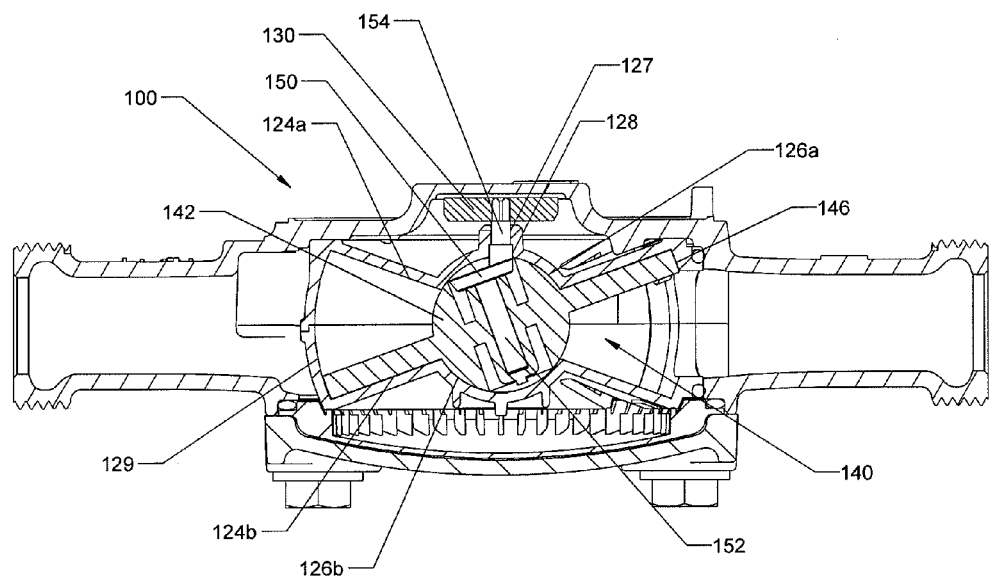
FIG. 8 is a sectional view of the embodiment of FIG. 7.
Figure 10:
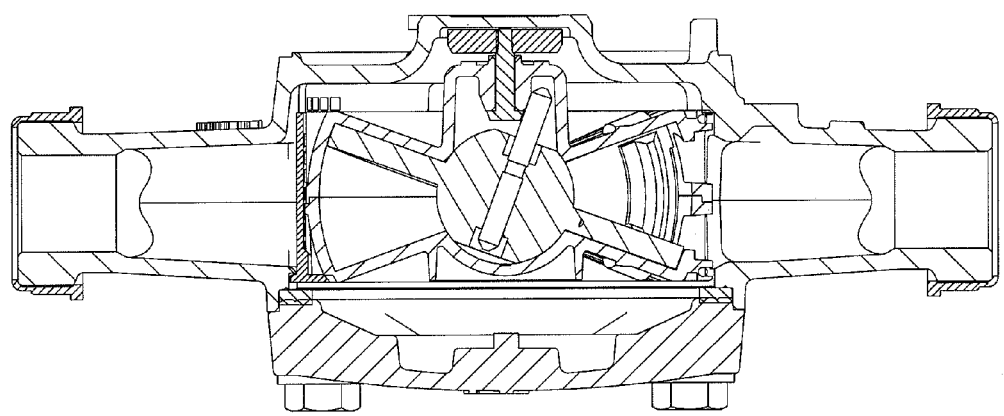
FIG. 10 is a sectional view of a prior art nutating disc meter.

A water meter comprising an alternate embodiment 100 of the present invention is shown in FIGS. 7-8. Except for the differences noted in the following paragraphs, the alternate embodiment is structured and operates generally the same as the embodiment shown in FIGS. 1-6. (For this reason, each part in the embodiment shown in FIGS. 7-8 that is identified by a reference numeral beginning in the form '1xx', either in this text or in the figures, corresponds to the same part in the embodiment shown in FIGS. 1-6 without the leading '1', unless otherwise noted herein). Referring to FIG. 8, the upper portion of the ball socket 126a comprises a cylindrical extension 128 concentric with the hole 127. As shown in FIG. 9, the unitary biaxial member 150 used in this embodiment comprises a spindle 152 joined to a drive shaft 154 having a round shoulder 156. The drive shaft 154 is concentric with the shoulder 156, which is larger in diameter than the drive shaft 154 and sized to fit and rotate within cylindrical extension 128. As shown, the ball 142 includes a bore 145 in which the spindle 152 rotates. The hole 127 in the center of the ball socket 126a, and fit of the shoulder 156 in the cylindrical extension 128, constrain the movement of the drive shaft 154 such that it rotates and fixes the axial orientation of the drive shaft 154 into a vertical (as shown) orientation.

As shown in FIG. 9, the longitudinal axis 153 of the spindle 152 is offset from the longitudinal axis 155 of the drive shaft 154, thus setting the ball and disc 140 at a desired angle within the measuring chamber 120. As pressurized water flows into the ingress 121 of the measuring chamber 120 and into contact with the disc 146, the ball and disc 140 nutate to permit passage of the water through the measuring chamber 120. As the ball and disc 140 nutate, the spindle 152 rotates within the bore 145 in the ball 142, and also precesses about the longitudinal axis 155 of the drive shaft 154. With the drive shaft 154 joined to the spindle 152 by the shoulder 156, the unitary biaxial member 150 translates the nutation of the ball and disc 140 into rotation of the drive shaft 154, which in turn rotates the magnet 130.

The external housing 12 of the meter 10 is often exposed to the elements. It therefore should be constructed of a durable, weather-resistant material. To avoid interfering with the coupling of the magnet 30 with a register, the housing 12 should be constructed of a non-magnetic material. Preferably, the housing 12 is made of brass, but any other durable, weather-resistant, non-magnetic material could be utilized.

One advantage of the present invention is that each component can be made of a material with properties optimized for that component. The measuring chamber 20, ball and disc 40, and unitary biaxial member 50 are preferably made of plastics. Plastics vary in durability, flexibility, strength, lubricity, surface finish and other properties, as is known to those skilled in the art. In a preferred embodiment, the measuring chamber 20 and the ball and disc 40 are made of an engineering thermoplastic, such as a polyphenylene ether. The unitary biaxial member 50 is made of a complimentary engineering thermoplastic, such as a glass-filled polyamide. These materials allow a proper interface between the measuring chamber 20, ball and disc 40, and unitary biaxial member 50.

Another advantage of the present invention is that it eliminates the need for a control block. This results in a more compact design and thus smaller meter housing 10. This reduction in size of the meter housing 10 saves materials cost of the housing, which as noted is typically made of brass and is expensive relative to the plastics of the internal components. Likewise, the use of an engineering thermoplastic for the unitary biaxial member 50 eliminates the need for a stainless steel spindle, also saving cost.

Although the present invention has been described and shown with reference to certain preferred embodiments thereof, other embodiments are possible. The foregoing description is therefore considered in all respects to be illustrative and not restrictive. Therefore, the present invention should be defined with reference to the claims and their equivalents, and the spirit and scope of the claims should not be limited to the description of the preferred embodiments contained herein.

The invention claimed is:

1. A water meter comprising:
 a rotating magnet having an axis of rotation;
 a measuring chamber comprising a ball socket with an opening coaxial with said magnet;
 a ball and disc disposed within said measuring chamber, said ball disposed within said ball socket and comprising a diametric bore with at least one open end;
 a unitary biaxial member comprising a drive shaft joined to a spindle having a longitudinal axis offset angularly from that of the drive shaft;
 wherein said spindle is disposed within said bore in said ball and free to rotate therein and said drive shaft extends from said ball through the opening in said ball socket to couple with said magnet, said opening constraining the drive shaft into coaxial alignment with said rotating magnet, such that the angular offset between the axis of the drive shaft and the axis of the spindle causes said spindle to trace a cone and said ball and disc to nutate in response to water flow through said measuring chamber, thereby translating said water flow into rotation of said drive shaft and magnet, and
 wherein said spindle is joined to said drive shaft by a cap, said cap being disposed within a cavity in said ball defined substantially by a small circle of said ball and is adapted to rotate therein.

2. The water meter of claim 1, wherein the cap has an outer side and an inner side, and the outer side is in the shape of a portion of a sphere having the same diameter as said ball.

3. The water meter of claim 1, wherein said ball socket comprises a substantially cylindrical extension concentric with said opening and said spindle is joined to said drive shaft by a round shoulder adapted to fit within said cylindrical extension and concentric with said drive shaft, said extension configured to permit rotation of said shoulder as said ball and disc nutate in response to water flow through said meter.

4. The water meter of claim 1, wherein said bore has an upper end and a lower end, said upper end being open where said spindle is joined to said drive shaft.

5. The water meter of claim 4, wherein said bore is closed at its lower end.

6. The water meter of claim 1, wherein said unitary biaxial member is made of a different material than said ball.

7. The water meter of claim 6, wherein said unitary biaxial member is made of glass-filled polyamide and said ball is made of polyphenylene ether.

8. The water meter of claim 1, wherein the diameter of said drive shaft is between one-fourth and one-eighth of the diameter of the ball.

9. The water meter of claim 1, wherein said drive shaft is coupled directly to said magnet.

10. The water meter of claim 9, wherein said magnet has a socket adapted to receive said drive shaft and said drive shaft extends into said socket.

11. The water meter of claim 1, wherein said spindle is fluted.

12. A water meter comprising:
a rotating magnet having an axis of rotation;
a measuring chamber having an ingress and an egress for water flow, and comprising a ball socket and an opening in said ball socket aligned with the axis of rotation of said magnet;
a ball and disc disposed with said measuring chamber, said ball disposed within said ball socket and comprising a diametric bore and a cavity, said bore terminating at one end thereof into said cavity, said cavity defined substantially by a small circle of said ball concentric with said bore;
an unitary biaxial member comprising a drive shaft having a distal end and a proximate end, a spindle having a longitudinal axis offset angularly from that of said drive shaft, and a connector connecting the proximate end of said drive shaft to said spindle, said spindle disposed within said bore and free to rotate therein, the proximate end of said drive shaft displaced from said spindle by said connector to the edge of said cavity, said drive shaft extending through the opening in said ball socket and thereby positioned coaxially with said rotating magnet, the distal end of said drive shaft being coupled to the center of said magnet;
whereby as water flows through said ingress into said measuring chamber and over said disc, the end of said spindle proximate said connector precesses with respect to said drive shaft, causing said disc to nutate and translating said water flow into rotation of said drive shaft, and
wherein said spindle is joined to said drive shaft by a cap, said cap being disposed within said cavity in said ball and is adapted to rotate therein.

13. The water meter of claim 12, wherein the cap has an outer side and an inner side, and the outer side is in the shape of a portion of a sphere having the same diameter as said ball.

14. The water meter of claim 12, wherein said bore is closed at its lower end.

15. The water meter of claim 12, wherein the diameter of said drive shaft is between one-fourth and one-eighth of the diameter of the ball.

16. The water meter of claim 12, wherein said drive shaft is coupled directly to said magnet.

17. The water meter of claim 12, wherein said spindle is fluted.

18. A nutating disc water meter comprising a ball and disc, a magnet, and a unitary biaxial member coupling said ball to said magnet, said unitary biaxial member comprising a spindle disposed in said ball and a drive shaft coupled to said magnet, and
wherein said spindle is joined to said drive shaft by a cap, said cap being disposed within a cavity in said ball defined substantially by a small circle of said ball and is adapted to rotate therein.

19. The water meter of claim 18 wherein said ball comprises a diametric bore and said spindle is disposed within said bore and is adapted to rotate therein.

20. The water meter of claim 18, wherein said drive shaft has a first longitudinal axis, said spindle has a second longitudinal axis, and said first and second axes intersect proximate the center of the ball.

21. The water meter of claim 18, further comprising a measuring chamber comprising a ball socket, wherein said ball is disposed in said ball socket, said ball socket comprising a substantially cylindrical extension concentric with said drive shaft and wherein said spindle is joined to said drive shaft by a round shoulder adapted to fit within said cylindrical extension and concentric with said drive shaft.

22. A nutating disc water meter comprising a ball and disc, and a unitary biaxial member comprising a drive shaft with a first longitudinal axis, a spindle with a second longitudinal axis;
wherein said first and second axes intersect proximate the center of the ball, and
wherein said spindle is joined to said drive shaft by a cap, said cap being disposed within a cavity in said ball defined substantially by a small circle of said ball and is adapted to rotate therein.

23. The water meter of claim 22 wherein said ball comprises a diametric bore and said spindle is disposed within said bore and is adapted to rotate therein.

24. The water meter of claim 22, further comprising a measuring chamber comprising a ball socket, wherein said ball is disposed in said ball socket, said ball socket comprising a substantially cylindrical extension concentric with said drive shaft and wherein said spindle is joined to said drive shaft by a round shoulder adapted to fit within said cylindrical extension and concentric with said drive shaft.

* * * * *